United States Patent
Hemphill et al.

(10) Patent No.: US 9,587,559 B2
(45) Date of Patent: Mar. 7, 2017

(54) ACCESSORIES DRIVE SYSTEM INCLUDING A TRANSMISSION DRIVEN MOTOR GENERATOR UNIT

(71) Applicant: Schaeffler Technologies AG & Co. KG, Herzogenaurach (DE)

(72) Inventors: Jeffrey Hemphill, Copley, OH (US); Philip George, Wooster, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 14/723,961

(22) Filed: May 28, 2015

(65) Prior Publication Data
US 2015/0354447 A1 Dec. 10, 2015

Related U.S. Application Data

(60) Provisional application No. 62/009,660, filed on Jun. 9, 2014.

(51) Int. Cl.
*B60K 6/38* (2007.10)
*F02B 63/04* (2006.01)

(52) U.S. Cl.
CPC ............. *F02B 63/04* (2013.01); *B60K 6/38* (2013.01)

(58) Field of Classification Search
CPC .................................. F02B 63/04; B60K 6/38
USPC .............................................................. 74/11
See application file for complete search history.

(56) References Cited

U.S. PATENT DOCUMENTS

| | | | | |
|---|---|---|---|---|
| 2,899,846 A | * | 8/1959 | Tuck | F16H 3/66 475/281 |
| 2,930,242 A | * | 3/1960 | George | B62D 55/12 180/53.2 |
| 5,558,588 A | * | 9/1996 | Schmidt | B60K 6/365 180/65.25 |
| 5,635,805 A | * | 6/1997 | Ibaraki | B60K 6/46 180/65.245 |
| 5,669,842 A | * | 9/1997 | Schmidt | B60K 6/365 180/65.25 |
| 6,048,288 A | * | 4/2000 | Tsujii | B60H 1/3222 180/65.25 |
| 6,464,028 B1 | | 10/2002 | Imani | |

(Continued)

FOREIGN PATENT DOCUMENTS

JP 2012232714 11/2012
WO WO2014177138 11/2014

*Primary Examiner* — Karen Beck
(74) *Attorney, Agent, or Firm* — Chester Paul Maliszewski

(57) ABSTRACT

A system including: at least one accessory device connected to an accessories drive shaft; a motor/generator including an input/output shaft; a first clutch arranged to receive torque from an engine and connected to the accessories drive shaft; a second clutch connected to the input/output shaft; and first and second torque transfer elements. The first torque transfer element is connected to the input/output shaft and the accessories drive shaft to reduce a rotational speed of the input/output shaft. The second torque transfer element is arranged to connect to a transmission input shaft, is connected to the second clutch, and is arranged to increase a rotational speed of the transmission input shaft. For a generator mode, the first clutch is arranged to be opened, the second clutch is arranged to be closed; and the transmission input shaft is arranged to rotate the input/output shaft via the second torque transfer element.

20 Claims, 1 Drawing Sheet

(56) References Cited

U.S. PATENT DOCUMENTS

| | | | |
|---|---|---|---|
| 7,301,302 B2 * | 11/2007 | Yoshii | B60K 6/26 |
| | | | 180/65.1 |
| 8,056,659 B2 * | 11/2011 | Oba | B60K 6/387 |
| | | | 180/65.225 |
| 8,257,213 B2 * | 9/2012 | Komada | B60K 6/36 |
| | | | 475/5 |
| 8,660,724 B2 * | 2/2014 | Tarasinski | B60K 6/48 |
| | | | 180/65.21 |
| 8,978,798 B2 * | 3/2015 | Dalum | B60K 6/12 |
| | | | 180/65.22 |
| 2003/0116368 A1 | 6/2003 | Winkelman et al. | |
| 2009/0011887 A1 * | 1/2009 | Komada | B60K 6/36 |
| | | | 475/5 |
| 2009/0098976 A1 | 4/2009 | Usoro et al. | |
| 2009/0255741 A1 * | 10/2009 | Major | B60K 6/48 |
| | | | 180/65.22 |
| 2010/0065358 A1 * | 3/2010 | Harris | B60K 6/48 |
| | | | 180/65.265 |
| 2011/0152026 A1 * | 6/2011 | Williams | B60K 17/344 |
| | | | 475/86 |
| 2012/0073281 A1 * | 3/2012 | Hirose | B60K 6/48 |
| | | | 60/439 |
| 2015/0345619 A1 * | 12/2015 | Kawakami | F16H 61/0028 |
| | | | 74/15.2 |
| 2016/0082950 A1 * | 3/2016 | Monden | F16H 3/725 |
| | | | 477/3 |

* cited by examiner

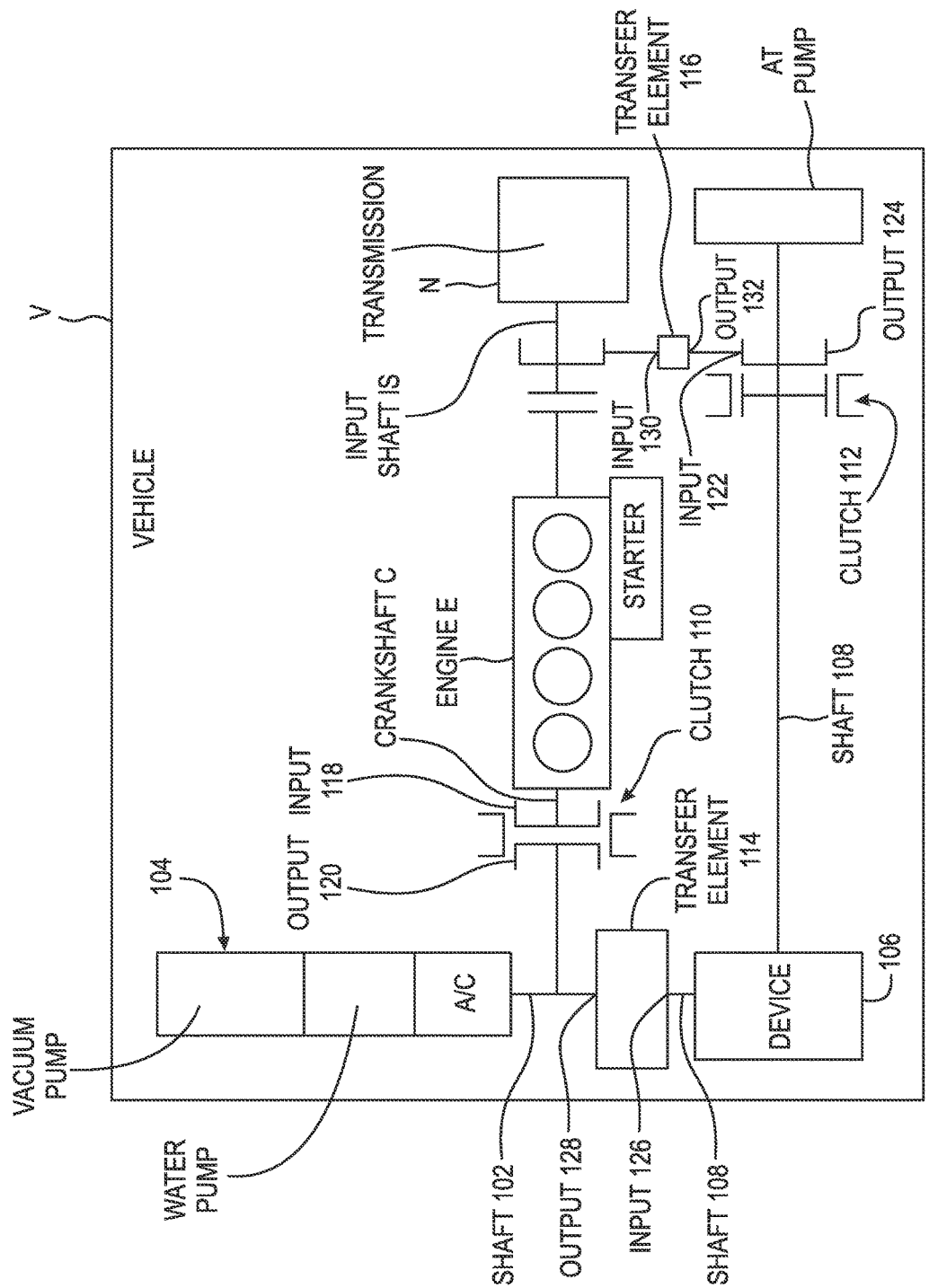

ACCESSORIES DRIVE SYSTEM INCLUDING A TRANSMISSION DRIVEN MOTOR GENERATOR UNIT

CROSS-REFERENCE TO RELATED APPLICATIONS

This application claims the benefit under 35 U.S.C. §119(e) of U.S. Provisional Patent Application No. 62/009,660, filed Jun. 9, 2014, which application is incorporated herein by reference in its entirety.

TECHNICAL FIELD

The present disclosure relates to a system for driving accessory devices for a vehicle using an output of an electric machine and operating the electric machine as a generator using torque from a transmission input shaft. In particular, the electric machine is disconnected from an engine for the vehicle during operation as a generator.

BACKGROUND

Known systems for a vehicle including a combination electric motor and generator for driving accessories for the vehicle maintain a connection between an engine for the vehicle and the input/output shaft of the combination electric motor and generator during operation of the combination electric motor and generator as a generator, for example, when transmitting torque from a transmission input shaft to the combination electric motor and generator. However, maintaining the connection between the engine and input/output shaft decreases the efficiency of the generator operation by introducing drag from the engine.

SUMMARY

According to aspects illustrated herein, there is provided an accessories drive system for a vehicle, including: an accessories drive shaft; at least one accessory device connected to the accessories drive shaft; a combination electric motor and generator device including an input/output shaft; a first clutch including a first clutch input arranged to receive torque from an engine for the vehicle and a first clutch output connected to the accessories drive shaft; a second clutch including a second clutch input and a second clutch output connected to the input/output shaft; and first and second torque transfer elements. The first torque transfer element includes a first transfer input connected to the input/output shaft and a first transfer output connected to the accessories drive shaft, and is arranged to reduce a first speed of rotation of the input/output shaft. The second torque transfer element includes a second transfer input arranged to connect to an input shaft for a transmission for the vehicle and a second transfer output connected to the second clutch input, and is arranged to increase a second speed of rotation of the transmission input shaft.

According to aspects illustrated herein, there is provided an accessories drive system for a vehicle, including: an accessories drive shaft; at least one accessory device connected to the accessories drive shaft; a combination electric motor and generator device including an input/output shaft; a first clutch including a first clutch input arranged to receive torque from an engine for the vehicle and a first clutch output connected to the accessories drive shaft; a second clutch including a second clutch input and a second clutch output connected to the input/output shaft; and first and second torque transfer elements. The first torque transfer element includes a first transfer input connected to the input/output shaft and a first transfer output connected to the accessories drive shaft, and is arranged to reduce a first speed of rotation of the input/output shaft. The second torque transfer element includes a second transfer input arranged to connect to an input shaft for a transmission for the vehicle and a second transfer output connected to the second clutch input, and is arranged to increase a second speed of rotation of the transmission input shaft. For an electric motor drive mode the first clutch is arranged to be opened and the combination electric motor and generator device is arranged to rotate the accessories drive shaft via the first torque transfer element. For a generator mode the first clutch is arranged to be opened, the second clutch is arranged to be closed; and the transmission input shaft is arranged to rotate the input/output shaft via the second torque transfer element.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1 is a schematic block diagram of a vehicle with an accessories drive system including an engine disconnect.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

FIG. 1 is a schematic block diagram of accessories drive system 100 for vehicle V including an engine disconnect. Accessories drive system 100 includes accessories drive shaft 102, at least one accessory device 104 connected to accessories drive shaft 102; combination electric motor and generator device 106 including input/output shaft 108; clutches 110 and 112; and torque transfer elements 114 and 116. Clutch 110 includes clutch input 118 arranged to receive torque from engine E for vehicle V, for example from crankshaft C, and clutch output 120 connected to shaft 102. Clutch 112 includes clutch input 122, and clutch output 124 connected to input/output shaft 108.

Torque transfer element 114 includes transfer input 126 connected to input/output shaft 108, and transfer output 128 connected to accessories drive shaft 102. Element 114 is arranged to reduce a speed of rotation of input/output shaft 108 as further described below. Element 116 includes transfer input 130 arranged to connect to input shaft IS for transmission N for vehicle V, and transfer output 132 connected to clutch input 122. Element 116 is arranged to increase a speed of rotation of transmission input shaft IS, as further described below. In an example embodiment, clutch output 124 is directly connected to shaft 108, so that a ratio of a speed of rotation of clutch output 124 and input/output shaft 108 is 1:1. Thus, losses associated with ratio-changing devices, such as belts or gears, are eliminated.

For an electric motor drive mode, clutch 110 is arranged to be opened to disconnect shaft 102 from engine E and combination electric motor and generator device 106 is arranged to rotate accessories drive shaft 102 via torque transfer element 114. Clutch 112 also is opened. In an example embodiment, for the electric motor drive mode, transfer element 114 is arranged to reduce the speed of input/output shaft 108 by a ratio of 2.5:1. Advantageously, in electric motor drive mode, device 106 is able to provide the power and rotation of shaft 102 required for optimal operation of devices 104 regardless of and independent of rotation of the engine and crankshaft C. Further, transfer element 114 enables an optimal rotational speed of and torque from device 106 to be reduced to the speed and torque required for optimal operation of devices 104.

For a generator mode, clutch 112 is arranged to be closed, clutch 110 is arranged to be opened, and transmission input shaft IS is arranged to rotate input/output shaft 108 via torque transfer element 116 to operate device 106 as a generator. In an example embodiment, for the generator mode, torque transfer element 116 is arranged to increase the speed of shaft IS by a ratio in a range between 1:1.5 and 1:2.5. Advantageously, opening clutch 110 during generator mode separates shaft 102 from engine E and crankshaft C, eliminating losses associated with drag from the engine and crankshaft. Further, transfer element 116 enables rotational speed of and torque from shaft IS to be increased to an optimal rotational speed and torque from optimal operation of device 106 as a generator.

Thus, system 100 provides two speed ratios needed for optimal operation of device 106 as a generator and as a motor driving accessories 104. For example, for optimal performance, device 106 should typically be turning about 2.5 times faster than shaft 102. Typically, shaft IS rotates at approximately the same speed as shaft 102. In an example embodiment, element 116 provides the required ratio of 1:2.5. In an example embodiment, to reduce the speed of shaft 102, element 116 provides a ratio closer to 1:1.5.

Clutches 110 and 112 can be any clutch known in the art, including but not limited to dog clutches, switchable one-way clutches, and friction clutches. Elements 114 and 116 can be any torque transfer devices known in the art and include any combination of belts, chains, pulleys, or gears known in the art. In an example embodiment transmission pump AT is directly connected to clutch output 114.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An accessories drive system for a vehicle, comprising:
   an accessories drive shaft;
   at least one accessory device connected to the accessories drive shaft;
   a combination electric motor and generator device including an input/output shaft;
   a first clutch including:
      a first clutch input arranged to receive torque from an engine for the vehicle; and,
      a first clutch output connected to the accessories drive shaft;
   a second clutch including:
      a second clutch input; and,
      a second clutch output connected to the input/output shaft;
   a first torque transfer element:
      including:
         a first transfer input connected to the input/output shaft; and,
         a first transfer output connected to the accessories drive shaft; and,
      arranged to reduce a first speed of rotation of the input/output shaft; and,
   a second torque transfer element:
      including:
         a second transfer input arranged to connect to an input shaft for a transmission for the vehicle; and,
         a second transfer output connected to the second clutch input; and,
      arranged to increase a second speed of rotation of the transmission input shaft.

2. The accessories drive system of claim 1, wherein for an electric motor drive mode:
   the first clutch is arranged to be opened; and,
   the combination electric motor and generator device is arranged to rotate the accessories drive shaft via the first torque transfer element.

3. The accessories drive system of claim 2, wherein for the electric motor drive mode the second clutch is arranged to be opened.

4. The accessories drive system of claim 2, wherein for the electric motor drive mode the first torque transfer element is arranged to reduce the first speed to a third speed of the accessories drive shaft by a ratio of 2.5:1.

5. The accessories drive system of claim 1, wherein for a generator mode:
the second clutch is arranged to be closed;
the transmission input shaft is arranged to rotate the input/output shaft via the second torque transfer element; and,
the first clutch is arranged to be opened.

6. The accessories drive system of claim 5, wherein for the generator mode the second torque transfer element is arranged to increase the second speed to a third speed of the input/output shaft by a ratio in a range between 1:1.5 and 1:2.5.

7. The accessories drive system of claim 1, wherein a ratio of a third speed of rotation of the second clutch output and the first speed is 1:1.

8. The accessories drive system of claim 1, wherein the first torque transfer device includes:
a belt and at least one pulley; or,
a chain and at least one pulley; or,
at least one gear.

9. The accessories drive system of claim 1, wherein the second torque transfer device includes:
a belt and at least one pulley; or,
a chain and at least one pulley; or,
at least one gear.

10. An accessories drive system for a vehicle, comprising:
an accessories drive shaft;
at least one accessory device connected to the accessories drive shaft;
a combination electric motor and generator device including an input/output shaft;
a first clutch including:
a first clutch input arranged to receive torque from an engine for the vehicle; and,
a first clutch output connected to the accessories drive shaft;
a second clutch including:
a second clutch input; and,
a second clutch output connected to the input/output shaft;
a first torque transfer element:
including:
a first transfer input connected to the input/output shaft; and,
a first transfer output connected to the accessories drive shaft; and,
arranged to reduce a first speed of rotation of the input/output shaft; and,
a second torque transfer element:
including:
a second transfer input arranged to connect to an input shaft for a transmission for the vehicle; and,
a second transfer output connected to the second clutch input; and,
arranged to increase a second speed of rotation of the transmission input shaft, wherein for a generator mode:
the first clutch is arranged to be opened;
the second clutch is arranged to be closed; and,
the transmission input shaft is arranged to rotate the input/output shaft via the second torque transfer element.

11. The accessories drive system of claim 10, wherein for the generator mode the second torque transfer element is arranged to increase the second speed to a third speed of the input/output shaft by a ratio in a range between 1:1.5 and 1:2.5.

12. The accessories drive system of claim 10, wherein for an electric motor drive mode:
the first clutch is arranged to be opened;
the second clutch is arranged to be opened; and,
the combination electric motor and generator device is arranged to rotate the accessories drive shaft via the first torque transfer element.

13. The accessories drive system of claim 10, wherein for the electric motor drive mode the first torque transfer element is arranged to reduce the first speed by a ratio of 2.5:1.

14. The accessories drive system of claim 10, wherein a ratio of a third speed of rotation of the second clutch output and the first speed is 1:1.

15. The accessories drive system of claim 10, wherein the first torque transfer device includes:
a belt and at least one pulley; or,
a chain and at least one pulley; or,
at least one gear.

16. The accessories drive system of claim 10, wherein the second torque transfer device includes:
a belt and at least one pulley; or,
a chain and at least one pulley; or,
at least one gear.

17. An accessories drive system for a vehicle, comprising:
an accessories drive shaft;
at least one accessory device connected to the accessories drive shaft;
a combination electric motor and generator device including an input/output shaft;
a first clutch including:
a first clutch input arranged to receive torque from an engine for the vehicle; and,
a first clutch output connected to the accessories drive shaft;
a second clutch including:
a second clutch input; and,
a second clutch output connected to the input/output shaft;
a first torque transfer element:
including:
a first transfer input connected to the input/output shaft; and,
a first transfer output connected to the accessories drive shaft; and,
arranged to reduce a first speed of rotation of the input/output shaft; and,
a second torque transfer element:
including:
a second transfer input arranged to connect to an input shaft for a transmission for the vehicle; and,
a second transfer output connected to the second clutch input; and,
arranged to increase a second speed of rotation of the transmission input shaft, wherein:
for an electric motor drive mode:
the first clutch is arranged to be opened;
the second clutch is arranged to be opened; and,
the combination electric motor and generator device is arranged to rotate the accessories drive shaft via the first torque transfer element; and,
for a generator mode:
the first clutch is arranged to be opened;
the second clutch is arranged to be closed; and,
the transmission input shaft is arranged to rotate the input/output shaft via the second torque transfer element.

18. The accessories drive system of claim 17, wherein for the generator mode the second torque transfer element is arranged to increase the second speed to a third speed of the input/output shaft by a ratio in a range between 1:1.5 and 1:2.5.

19. The accessories drive system of claim 17, wherein for the electric motor drive mode the first torque transfer element is arranged to reduce the first speed by a ratio of 2.5:1.

20. The accessories drive system of claim 17, wherein a ratio of a third speed of rotation of the second clutch output and the first speed is 1:1.

* * * * *